(12) United States Patent
Miyata et al.

(10) Patent No.: US 12,057,547 B2
(45) Date of Patent: Aug. 6, 2024

(54) METHOD OF MANUFACTURING BATTERY PACK

(71) Applicants: TOYOTA JIDOSHA KABUSHIKI KAISHA, Toyota (JP); PRIME PLANET ENERGY & SOLUTIONS, INC., Tokyo (JP)

(72) Inventors: Shintaro Miyata, Toyota (JP); Yoshinori Shibata, Toyota (JP); Nobuyuki Yamazaki, Toyota (JP); Hirotoshi Kondo, Toyota (JP); Seiichi Sakuramoto, Tokyo (JP)

(73) Assignees: TOYOTA JIDOSHA KABUSHIKI KAISHA, Toyota (JP); PRIME PLANET ENERGY & SOLUTIONS, INC., Tokyo (JP)

( * ) Notice: Subject to any disclaimer, the term of this patent is extended or adjusted under 35 U.S.C. 154(b) by 0 days.

(21) Appl. No.: 17/750,727

(22) Filed: May 23, 2022

(65) Prior Publication Data
US 2022/0384839 A1    Dec. 1, 2022

(30) Foreign Application Priority Data
May 25, 2021   (JP) ................................. 2021-087840

(51) Int. Cl.
*H01M 10/04* (2006.01)
*H01M 50/516* (2021.01)
*H01M 50/553* (2021.01)

(52) U.S. Cl.
CPC ... *H01M 10/0481* (2013.01); *H01M 10/0404* (2013.01); *H01M 50/516* (2021.01); *H01M 50/553* (2021.01)

(58) Field of Classification Search
CPC ... H01M 10/04–0409; H01M 10/0481; H01M 50/20; H01M 50/204–209;
(Continued)

(56) References Cited

U.S. PATENT DOCUMENTS

2022/0040791 A1* 2/2022 McCartney, Jr. ...... B25J 9/0084

FOREIGN PATENT DOCUMENTS

| JP | 2018-037385 A | 3/2018 |
|---|---|---|
| JP | 2020-021705 A | 2/2020 |

(Continued)

OTHER PUBLICATIONS

Machine translation of Park, KR 2015-0125387. Originally available Nov. 9, 2015 (Year: 2015).*
(Continued)

*Primary Examiner* — Jonathan Crepeau
*Assistant Examiner* — Jacob Buchanan
(74) *Attorney, Agent, or Firm* — Dinsmore & Shohl LLP

(57) ABSTRACT

A method of manufacturing a battery pack of the present disclosure stacks a plurality of battery cells such that one surfaces face the same direction and compresses the battery cells from both sides, inserts the compressed battery cells into the case such that the one surfaces are positioned on an open end side of the case, disposes a plurality of bus bars on the one surfaces of the battery cells so as to overlap the corresponding terminal, moves a pressurizing jig so as to press the bus bars toward a bottom surface of the case from a pressurization start position corresponding to a height position of the terminal of the battery cell farthest from the bottom surface, and bonds each of the plurality of bus bars to the corresponding terminal.

12 Claims, 4 Drawing Sheets

(58) Field of Classification Search
CPC ........... H01M 50/233–242; H01M 50/50–505; H01M 50/514–516
See application file for complete search history.

(56) References Cited

FOREIGN PATENT DOCUMENTS

| KR | 20150125387 A | * | 11/2015 | ............ H01M 10/04 |
| KR | 20170052920 A | * | 5/2017 | .......... H01M 10/058 |
| WO | 2012/133711 A1 | | 10/2012 | |

OTHER PUBLICATIONS

Machine translation of Jeon, KR 2017-0052920. Originally available May 15, 2017 (Year: 2017).*

* cited by examiner

METHOD OF MANUFACTURING BATTERY PACK

CROSS-REFERENCE TO RELATED APPLICATION

The present disclosure claims priority to Japanese Patent Application No. 2021-087840 filed on May 25, 2021, which is incorporated herein by reference in its entirety including specification, drawings and claims.

TECHNICAL FIELD

The present disclosure relates to a method of manufacturing a battery pack including a case and a plurality of battery cells arranged in a stacked configuration in the case.

BACKGROUND

A conventionally known stator includes a cover case open at one end, a plurality of battery cells respectively including a terminal disposed on one surface thereof and stacked such that the one surfaces face the same direction to be accommodated in the case, and a plurality of bus bars for connecting the plurality of battery cells in series (as described in, for example, Patent Literature 1). When manufacturing the battery pack, the plurality of battery cells is first stacked, and a stacked body of the battery cells is held from both sides by a plurality of binding jigs arranged in order from a lower side in a height direction. The stacked body is then inserted into the cover case such that the terminals of the battery cells are positioned on an upper side (open end side) by separating the plurality of binding jigs from the stacked body in turn from the lower side. The stacked body of the battery cells is then pressed from above by a pressurizing jig so as to be press-fitted into the cover case.

CITATION LIST

Patent Literature

PTL1: WO 2012/133711 A1

SUMMARY

The battery pack manufactured in the above manner does not require fasteners such as a binding bar, and thus the entire apparatus may be made smaller and lighter. However, it is necessary to limit a load applied from the pressurizing jig to the stacked body of the battery cells from the viewpoint of protection of components when manufacturing the conventional battery pack. Therefore, even if the stacked body is pressed from above by the pressurizing jig so as to be press-fitted into the cover case, heights of the terminals (height from a bottom surface of the case) vary among the plurality of battery cells. Thus, gaps between some terminals and the bus bars may become large when the bus bars are disposed on the stacked body such that they overlap with the corresponding terminals. As a result, bonding failure may occur when the bus bars are welded to some of the terminals.

A main object of the present disclosure is to provide a method of manufacturing battery pack that satisfactorily suppresses bonding failure between terminals of a plurality of battery cells arranged in a stacked configuration in a case and bus bars so as to improve production efficiency of the battery pack.

The present disclosure is directed to a method of manufacturing a battery pack including a case open at one end, a plurality of battery cells respectively including a terminal disposed on one surface thereof and stacked such that the one surfaces face the same direction to be accommodated in the case, and a plurality of bus bars respectively bonded to the corresponding terminal. The method includes: stacking the plurality of battery cells such that the one surfaces face the same direction and compressing the plurality of battery cells from both sides; inserting the plurality of compressed battery cells into the case such that the one surfaces are positioned on an open end side of the case; disposing the plurality of bus bars on the one surfaces of the plurality of battery cells so as to overlap the corresponding terminal; moving a pressurizing jig so as to press the plurality of bus bars toward a bottom surface of the case from a pressurization start position corresponding to a height position of the terminal of the battery cell farthest from the bottom surface; and bonding each of the plurality of bus bars to the corresponding terminal.

In the method of the present disclosure, the plurality of the stacked and compressed battery cells is inserted into the case such that the one surfaces are positioned on the open end side of the case. Then, the plurality of bus bars is disposed on the one surfaces of the plurality of battery cells so as to overlap the corresponding terminal. Further, the pressurizing jig is moved so as to press the plurality of bus bars toward the bottom surface of the case. At this time, the pressurizing jig starts to move from the pressurization start position corresponding to the height position of the terminal of the battery cell farthest from the bottom surface. Thus, the pressurizing jig sufficiently presses the bus bar that overlaps the terminal of the battery cell positioned on the bottom surface side in the case, even if the height positions of the terminals vary among the plurality of battery cells. Accordingly, the method of the present disclosure enables the bus bars and terminals to be bonded to each other while the gap between each terminal and the bus bar is sufficiently small. As a result, bonding failure between the bus bars and the terminals of the plurality of battery cells arranged in the stacked configuration in the case is satisfactorily suppressed so as to improve production efficiency of the battery pack.

DESCRIPTION OF EMBODIMENTS

The following describes some embodiments of the disclosure with reference to drawings.

Figure 1:
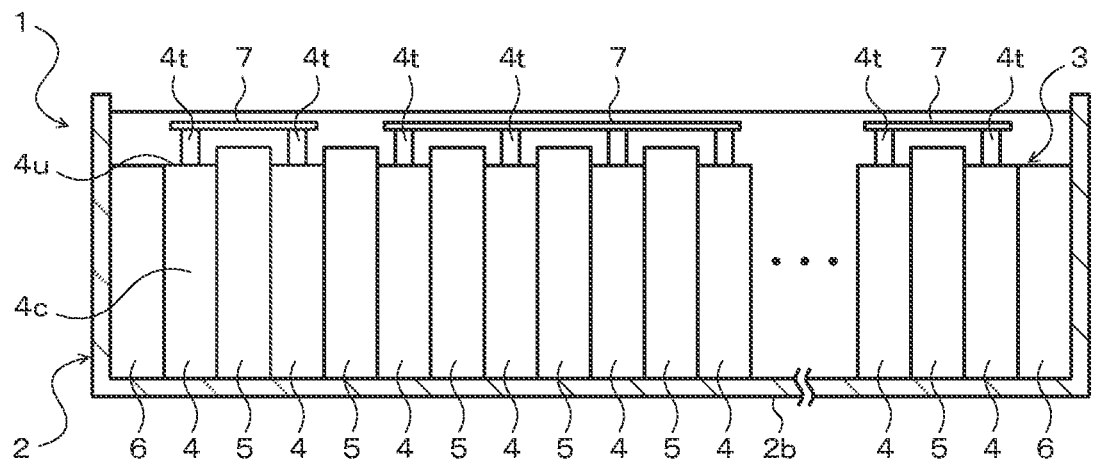
FIG. 1 is a schematic configuration diagram illustrating the battery pack manufactured by the method of manufacturing the battery pack the present disclosure.

FIG. 1 is a schematic configuration diagram illustrating a battery pack 1 manufactured by the method of the present disclosure. The battery pack 1 shown in FIG. 1 is mounted on a vehicle, such as an electric vehicle (Battery Electric Vehicle, Fuel Cell Electric Vehicle) or a hybrid vehicle (Hybrid Electric Vehicle, Plug-in Hybrid Electric Vehicle), so as to exchange electric power with an electric motor of the vehicle. As shown in the figure, the battery pack 1 includes a case 2 and a battery stack 3 that is accommodated in the case 2. The case 2 is a cast product made of a metal such as an aluminum alloy. One end of the case 2, that is, an end opposite a bottom surface 2b of the case 2 (an upper end in FIG. 1), is open. In this embodiment, the case 2 is formed to accommodate a single battery stack 3, but it may be formed to accommodate a plurality of battery stacks 3, for example, in parallel.

As shown in FIG. 1, the battery stack 3 includes a plurality of battery cells 4, a plurality of spacers (resin frames) 5 that are one less than the number of battery cells 4, a plurality (two) of end plates 6, and a plurality of bus bars 7. The battery stack 3 is formed by stacking the plurality of battery cells 4, the plurality of spacers 5, and the plurality of end plates 6 in one direction. In detail, the battery cells 4 and spacers 5 are alternately arranged between two end plates 6, and one spacer 5 is disposed between two battery cells 4. The plurality of battery cells 4 are connected in series by the plurality of bus bars 7.

The battery cells 4 of the battery stack 3 are, for example, sealed lithium-ion secondary batteries, nickel-metal hydride secondary batteries or the like, and include a metal housing 4c formed in a rectangular shape, electrodes and non-aqueous electrolyte and the like, which are not shown in the figure, accommodated inside the housing 4c. On an upper surface (one surface) 4u of each housing 4c, two terminals 4t (only one terminal 4t is shown for each battery cell 4 in FIG. 1), which are respectively connected to a positive or a negative electrode plate forming the above electrode. The terminals 4t of each battery cell 4 are electrically connected to the terminals 4t of the corresponding battery cell 4 via any of the bus bars 7.

The spacer 5 is made of an insulating material such as resin, and holds two adjacent battery cells 4 so as to insulate them from each other. Further, the spacer 5 also works as a heatsink member to dissipate heat from the two battery cells 4. The end plate 6 is made of a metal such as an aluminum alloy with insulation property or resin. The plurality of bus bars 7 are integrally supported by a module body, which is made of an insulating material such as resin and is not shown in the figure, such that they are exposed to outside on a front and a back of the module body. That is, in this embodiment, the plurality of battery cells 4 are electrically connected by a bus bar module including the plurality of bus bars 7 and the module body. The plurality of bus bars 7 may be installed individually for the plurality of battery cells 4.

Next, the method of the present disclosure for manufacturing the battery pack 1 will be described with reference to FIGS. 2 to 7.

Figure 2:
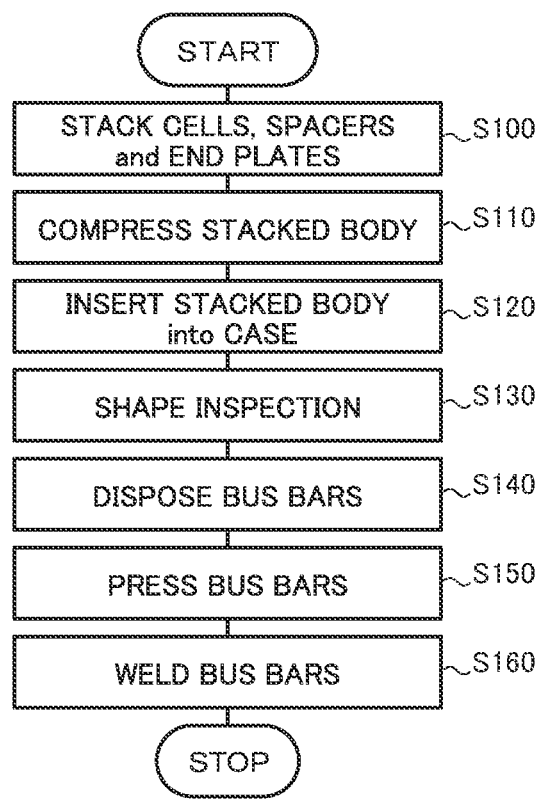
FIG. 2 is a flowchart to explain the method of manufacturing the battery pack of the present disclosure.

FIG. 2 is a flowchart to explain the method of manufacturing the battery pack 1 of the present disclosure. When manufacturing the battery pack 1, first, the battery cells 4 are assembled to each spacer 5 and the plurality of battery cells 4 and the plurality of spacers 5 are stacked such that the upper surfaces 4u, or terminals 4t of the battery cells 4 face the same direction (upward) (Step S100). In Step S100, the battery cells 4 and the spacers 5 are stacked such that one spacer 5 is disposed between two adjacent battery cells 4. The end plates 6 are disposed on both sides of a stacked body of battery cells 4 and spacers 5.

Figure 3:
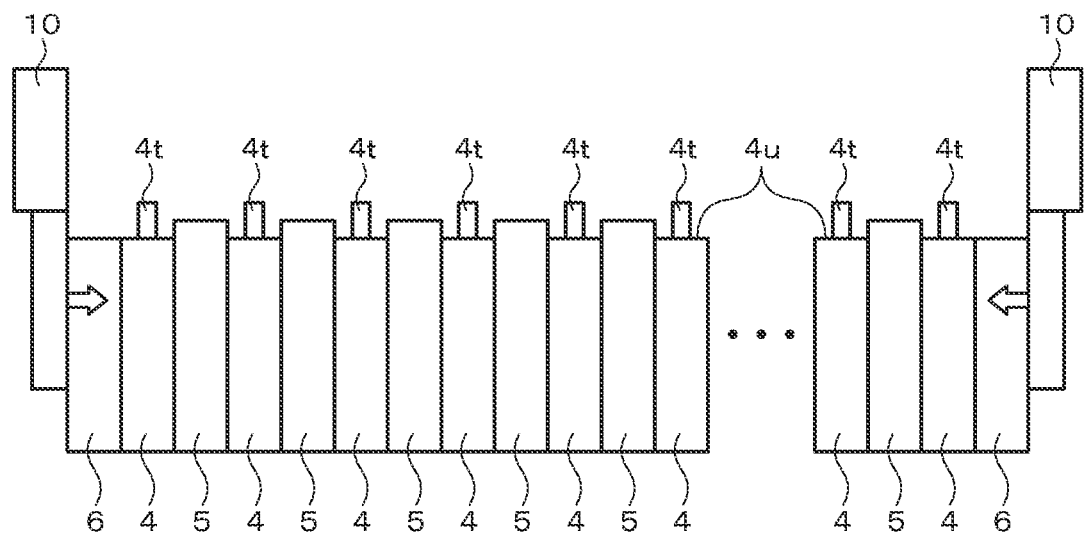
FIG. 3 is an explanatory view to explain the method of manufacturing the battery pack of the present disclosure.
Figure 4:
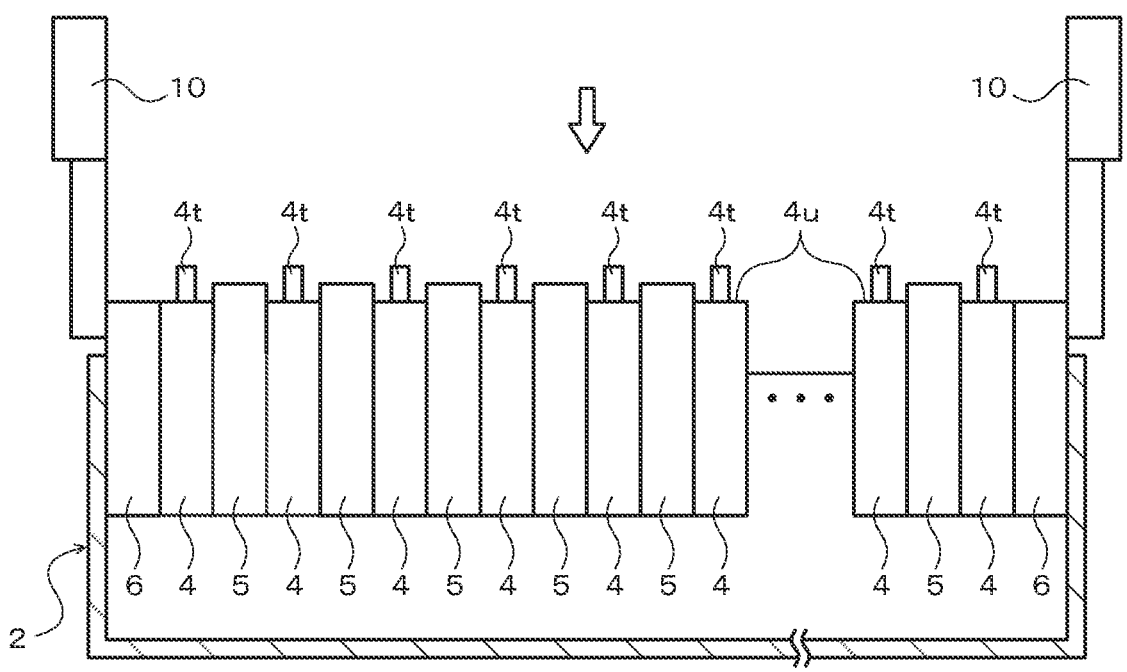
FIG. 4 is an explanatory view to explain the method of manufacturing the battery pack of the present disclosure.

The stacked body of the battery cells 4, the spacers 5, and the end plates 6 is compressed from both sides in a stacking direction by a pair of restraining jigs 10 included in a stack insertion device (not shown), as shown in FIG. 3 (Step S110). Further, the stacked body compressed and held by the restraining jig 10 is inserted (press-fitted) into the case 2 from an open end of the case 2 by the stack insertion device as shown in FIG. 4 (Step S120). Thus, the stacked body of the battery cells 4, the spacers 5, and the end plates 6 is held in a compressed state by the case 2, such that the battery stack 3 is formed.

Figure 5:
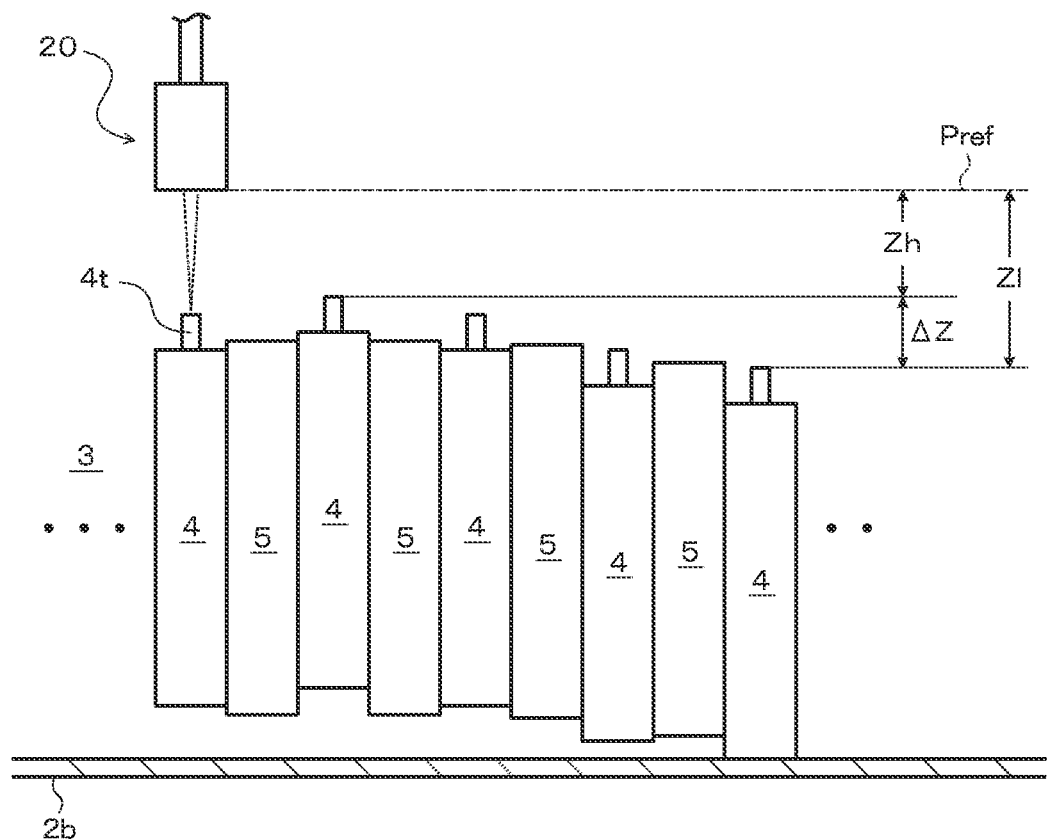
FIG. 5 is an explanatory view to explain the method of manufacturing the battery pack of the present disclosure.
Figure 6:
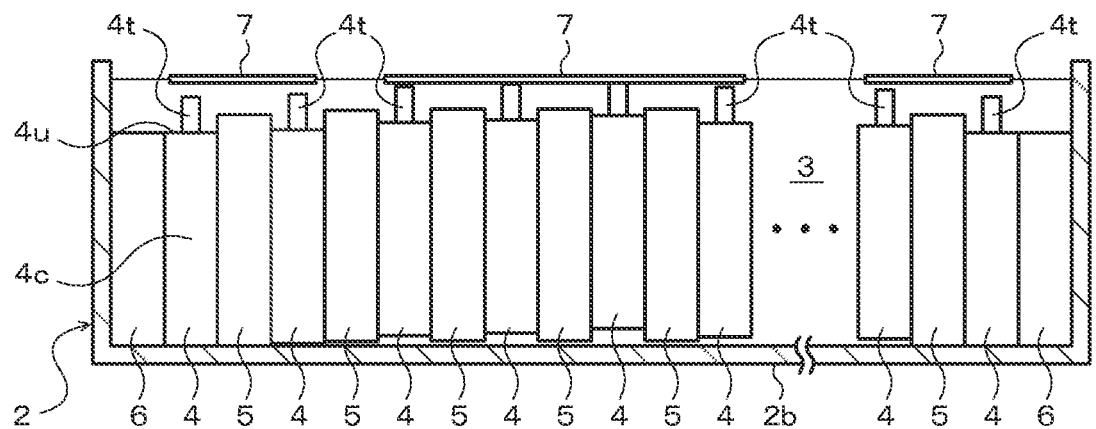
FIG. 6 is an explanatory view to explain the method of manufacturing the battery pack of the present disclosure.

Here, the housings 4c of the battery cells 4, the spacers 5 and the end plates 6 are all elastic, and there is some variation in their respective dimensions. Thus, even if the stacked body of the battery cells 4, the spacers 5, and the end plates 6 is compressed by the restraining jig 10 and inserted into the case 2, as shown in FIGS. 5 and 6, variations occur among the plurality of battery cells 4 in height positions of the terminals 4t on the upper surfaces 4u, that is, heights (distances in a depth direction (vertical direction) of the case 2) from the bottom surface 2b of the case 2 to the top of the terminals 4t. Based on this, in this embodiment, after the insertion (assembly) of the battery stack 3 into the case 2 is completed, a shape inspection of the battery stack 3 is performed (Step S130) to grasp the variations in the height positions of the terminals 4t among the plurality of battery cells 4.

In Step S130, as shown in FIG. 5, a distance from a predetermined arbitrary reference plane Pref to the top of the terminal 4t is measured for each of the plurality of battery cells 4 using a distance measuring device 20 such as a laser rangefinder. In this embodiment, the reference plane Pref is a plane that includes a starting point of the distance measuring device 20 and is orthogonal to the depth direction of the case 2. Further, in Step S130, a distance Zh from the terminal 4t of the battery cell 4 farthest from the bottom surface 2b of the case 2 (the battery cell 4 positioned at an uppermost side in FIG. 5) to the reference plane Pref and a distance Zl from the terminal 4t of the battery cell 4 closest to the bottom surface 2b of the case 2 (the battery cell 4 positioned at a lowermost side in FIG. 5) to the reference plane Pref are acquired. The distance Zh is a minimum value of the distances from the reference surface Pref to the top of the terminals 4t measured for the plurality of battery cells 4, and the distance Zl is a maximum value of the distances from the reference surface Pref to the top of the terminals 4t measured for the plurality of battery cells 4. Furthermore, in Step S130, a difference $\Delta Z$ (=Zl−Zh) between the distance Zh and the distance Zl is calculated.

Then, as shown in FIG. 6, the bus bar module is disposed on the upper surfaces 4u of the plurality of battery cells 4 such that each of the plurality of bus bars 7 overlaps the corresponding terminal 4t in the depth direction (vertical direction) of the case 2 (Step S140). At this time, since the height position of each battery cell 4 (terminal 4t) varies as a result of the assembly of the battery stack 3 to the case 2, a gap between each terminal 4t and the corresponding bus bar 7 also varies as shown in the figure.

Figure 7:
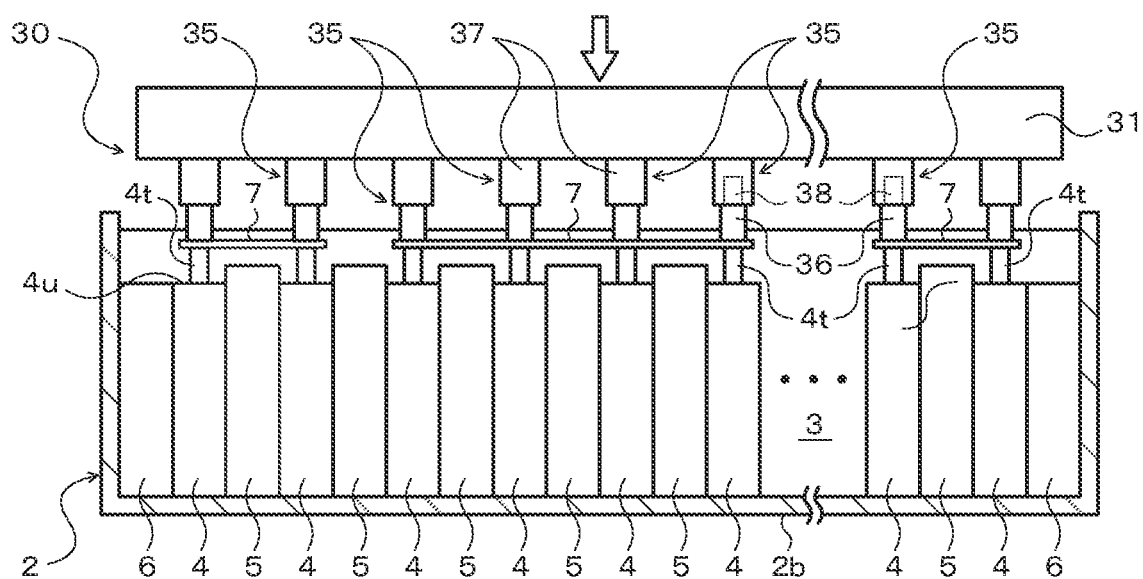
FIG. 7 is an explanatory view to explain the method of manufacturing the battery pack of the present disclosure.

After the assembly of the plurality of bus bars 7 (bus bar module) is completed, the case 2 accommodating the battery stack 3 is set (positioned) below a pressurizing jig 30 of a pressure welding facility, as shown in FIG. 7. The pressurizing jig 30 includes a moving member 31 capable of being raised and lowered in the vertical direction (up and down direction) in the figure, that is, in the depth direction of the case 2, and a plurality of pressing sections 35 supported by the moving member 31. In this embodiment, the moving member 31 supports the same number of pressing section 35 as the battery cells 4 of the battery stack 3 for one battery stack 3, and is raised and lowered in the depth direction of the case 2 by a moving mechanism (not shown) including an electric motor and the like, for example.

Each of the pressing sections 35 of the pressurizing jig 30 includes two pressing members 36, two support members 37, and two pressurizing mechanisms 38, as shown in FIG. 7. Each of the pressing sections 35 is supported by the moving member 31 such that the two pressing members 36 face the two terminals 4t of the corresponding battery cell 4 of the battery stack 3. Each of the support members 37 supports the corresponding pressing members 36 slidably (movably) in a movement direction (vertical direction, that is, depth direction of the case 2) of the pressurizing jig 30, that is, the moving member 31, via a linear guide or the like.

Each of the pressurizing mechanisms 38 is either a spring mechanism including an elastic body such as a coil spring, a disc spring or rubber, or a servo mechanism, and is disposed between the corresponding pressing member 36 and the support member 37. Each of the pressurizing mechanism generates a load based on a movement amount (push-in amount) of the corresponding pressing member 36 as the pressing member 36 moves toward the moving member 31. When the pressurizing mechanisms 38 of all the pressing sections 35 are not generating the load, contacting surfaces (lower end surfaces) of all the pressing members 36 are contained in approximately the same plane.

When the case 2 accommodating the plurality of battery cells 4 and the like is set below the pressurizing jig 30, the moving member 31 of the pressurizing jig 30 is moved by the moving mechanism (not shown) so as to press (push) the plurality of bus bars 7 to the bottom surface 2b side of the case 2, as shown in FIG. 7 (Step S150). In Step S150, as the moving member 31 moves against the case 2, at least one pressing member 36 (the contacting surface thereof) contacts the corresponding bus bar 7. Thus, each of the pressing members 36 is positioned at a position where the contacting surface (lower end surface) is separated from the above-mentioned reference surface Pref by a value close to the above-mentioned distance Zh, that is, at a pressurization start position corresponding to the height position of the terminal 4t of the battery cell 4 farthest from the bottom surface 2b of the case 2.

Then, in Step S150, the moving member 31 is moved (lowered) by the above-mentioned moving mechanism such that each of the pressing members 36 is moved (lowered) by a target movement amount toward the bottom surface 2b of the case 2 from the pressurization start position where at least one of the pressing members 36 (the contacting surface thereof) contacts the corresponding bus bar 7. In this embodiment, the target movement amount of each pressing member 36 is set to a sum of the difference $\Delta Z$ calculated in Step S130 and a predetermined margin (for example, several millimeters). Thus, even if some of the pressing members 36 are not in contact with the corresponding bus bars 7 at the pressurization start position, as the moving member 31 moves (descends), the pressing members 36 contact the corresponding bus bars 7 and press the bus bars 7 to the bottom surface 2b of the case 2.

While the moving member 31 moves toward the bottom surface 2b of the case 2, each of the pressurizing mechanisms 38 of the pressurizing jig 30 generates the load corresponding to the movement amount (push-in amount) of the pressing member 36 with respect to the support member 37 after contacting the bus bar 7, and the load is applied from each pressing member 36 to the corresponding bus bar 7. As a result, each of the bus bars 7 is elastically deformed by the pressurization of each pressing member 36 or some of the battery cells 4 are pushed toward the bottom surface 2b side of the case 2 by the pressurization of each pressing member 36, such that the gap between each terminal 4t and the bus bar 7 becomes sufficiently small.

When each of the pressing members 36 moves by the target movement amount ($\Delta Z$+ margin), the moving member 31 is stopped. Thereafter, a welder (for example, a laser welder, not shown) is inserted into an opening formed in the moving member 31 or the like, and each of the bus bars 7 is welded to the corresponding terminal 4t by the welder (Step S160). That is, each of the bus bars 7 is welded to the corresponding terminal 4t while being pressed against the terminal 4t by the corresponding pressing member 36 (pressurizing jig 30). Thus, each of the bus bars 7 and the terminal 4t are bonded to each other while the gap between the terminal 4t and the bus bars 7 is sufficiently small. When the welding process in Step S160 is completed, the manufacturing of one battery pack 1 is complete.

As described above, when manufacturing the battery pack 1, the plurality of the battery cells 4 and the like stacked and compressed by the pair of the restraining jig 10 is inserted into the case 2 such that the upper surfaces (one surfaces) 4u are positioned on the open end side of the case 2 (Step S120). Then, the plurality of bus bars 7 are disposed on the upper surfaces 4u of the plurality of battery cells 4 so as to overlap the corresponding terminal 4t (Step S140). Further, the moving member 31 and the plurality of pressing sections 35 of the pressurizing jig 30 are moved so as to press (push) the plurality of bus bars 7 toward the bottom surface 2b of the case 2 (Step S150). At this time, each of the pressing members 36 of the pressurizing jig 30 starts to move from the pressurization start position corresponding to the height position of the terminal 4t of the battery cell 4 farthest from the bottom surface 2b of the case 2 (height from the bottom surface 2b of the case 2). Thus, the pressing members 36 of the pressurizing jig 30 sufficiently pressurizes the corresponding bus bar 7 that overlaps the terminal 4t of the battery cell 4 positioned on the bottom surface 2b side in the case 2, even if the height positions of the terminals 4t arise among the plurality of battery cells 4.

That is, compared with the case where, for example, the pressurization start position of each pressing member 36 (pressurizing jig 30) is fixed at a relatively far position from the bottom surface 2b and the target movement amount of the moving member 31 is set to the sum of various design tolerances such as tolerances of the battery cells 4 and the spacers 5, the process of step S150 prevents the bus bars 7 that overlap the terminals 4t of the battery cells 4 positioned on the bottom surface 2b side in the case 2 from being insufficiently pushed in by the pressurizing jig 30. Accordingly, the above embodiment enables the bus bars 7 and terminals 4t to be welded (bonded) to each other (Step S160) while the gap between each terminal 4t and the bus bar 7 is sufficiently small, such that the time required for manufacturing the battery pack 1 is shortened. As a result, bonding failure between the bus bars 7 and the terminals 4t of the plurality of battery cells 4 arranged in the stacked configuration in the case 2 is satisfactorily suppressed so as to improve production efficiency of the battery pack 1.

Further, each of the pressing members 36 of the pressurizing jig 30 is moved from the pressurization start position by at least the difference $\Delta Z$ between the distance Zh indicating the height position of the terminal 4t of the battery cell 4 farthest from the bottom surface 2b of the case 2 and the distance Zl indicating the height position of the terminal 4t of the battery cell 4 closest to the bottom surface 2b of the case 2. This enables the pressurizing jig 30 to sufficiently press the bus bars 7 that overlaps the terminals 4t of the battery cells 4 that is close to the bottom surface 2b of the case 2 while suppressing an excessive pressurization of the bus bars 7 against the terminals 4t of the battery cells 4 separated from the bottom surface 2b of the case 2.

Further, the distances Zh and Zl and the difference ΔZ are acquired after inserting the stacked body including the plurality of battery cells 4 and the like into the case 2 and before disposing the plurality of bus bars 7 on the upper surfaces 4u of the plurality of battery cells 4 (Step S130). This enables the target movement amount of each of the pressing members 36 (moving member 31) corresponding to an insertion state of the plurality of battery cells 4 into the case 2 to be properly determined from the acquired distances Zh and Zl. The reference plane Pref for acquiring the distances Zh and Zl is not limited to the plane including the starting point of the distance measuring device 20 as described above. For example, the reference plane Pref may be the bottom surface 2b or an inner bottom surface of the case 2.

Further, in the above embodiment, the pressurizing jig 30 includes the plurality of pressing sections 35 respectively pressing the corresponding bus bars 7. Each of the pressing sections 35 includes the pressing member 36 configured to contact the bus bar 7, the support member 37 that movably supports the pressing member 36 in the movement direction of the pressurizing jig 30 (moving member 31), and the pressurizing mechanism 38 that is disposed between the pressing member 36 and the support member 37 and generates the load based on the movement amount of the pressing member 36. This enables each of the plurality of bus bars 7 to be properly pressurized in accordance with the gap between the bus bar 7 and the corresponding terminal 4t so as to decrease the gap, while avoiding applying excessive loads to the bus bars 7.

Further, in the above embodiment, each of the plurality of bus bars 7 is welded to the corresponding terminal 4t while pressed down by the pressurizing jig 30 (Step S160). This satisfactorily suppresses the bonding failure between the terminal 4c of each of the plurality of battery cells 4 and the bus bar 7.

As has been described above, the present disclosure is directed to a method of manufacturing a battery pack including a case open at one end, a plurality of battery cells respectively including a terminal disposed on one surface thereof and stacked such that the one surfaces face the same direction to be accommodated in the case, and a plurality of bus bars respectively bonded to the corresponding terminal. The method includes: stacking the plurality of battery cells such that the one surfaces face the same direction and compressing the plurality of battery cells from both sides; inserting the plurality of compressed battery cells into the case such that the one surfaces are positioned on an open end side of the case; disposing the plurality of bus bars on the one surfaces of the plurality of battery cells so as to overlap the corresponding terminal; moving a pressurizing jig so as to press the plurality of bus bars toward a bottom surface of the case from a pressurization start position corresponding to a height position of the terminal of the battery cell farthest from the bottom surface; and bonding each of the plurality of bus bars to the corresponding terminal.

In the method of the present disclosure, the plurality of stacked and compressed battery cells is inserted into the case such that the one surfaces are positioned on the open end side of the case. Then, the plurality of bus bars is disposed on the one surfaces of the plurality of battery cells so as to overlap the corresponding terminal. Further, the pressurizing jig is moved so as to press the plurality of bus bars toward the bottom surface of the case. At this time, the pressurizing jig starts to move from the pressurization start position corresponding to the height position of the terminal of the battery cell farthest from the bottom surface. Thus, the pressurizing jig sufficiently presses the bus bar that overlaps the terminal of the battery cell positioned on the bottom surface side in the case, even if the height positions of the terminals vary among the plurality of battery cells. Accordingly, the method of the present disclosure enables the bus bars and terminals to be bonded to each other while the gap between each terminal and the bus bar is sufficiently small. As a result, bonding failure between the bus bars and the terminals of the plurality of battery cells arranged in the stacked configuration in the case is satisfactorily suppressed so as to improve production efficiency of the battery pack.

The pressurizing jig may be moved from the pressurization start position by at least a difference between the height position of the terminal of the battery cell farthest from the bottom surface of the case and the height position of the terminal of the battery cell closest to the bottom surface of the case. This enables the pressurizing jig to sufficiently press the bus bar that overlaps the terminal of the battery cell that is close to the bottom surface of the case while suppressing an excessive pressurization of the bus bar against the terminal of the battery cell separated from the bottom surface of the case.

The method may include acquiring a distance from the terminal of the battery cell farthest from the bottom surface of the case to a predetermined reference surface and a distance from the terminal of the battery cell closest to the bottom surface of the case to the reference surface after inserting the plurality of battery cells into the case and before disposing the plurality of bus bars on the one surfaces of the plurality of battery cells. This enables a movement amount of the pressurizing jig corresponding to an insertion state of the plurality of battery cells into the case to be properly determined from the acquired distances.

The pressurizing jig may include a plurality of pressing sections respectively pressing the corresponding bus bar. Each of the pressing sections may include a pressing member configured to contact the bus bar, a support member that movably supports the pressing member in a movement direction of the pressurizing jig, and a pressurizing mechanism that is disposed between the pressing member and the support member and generates a load corresponding to a movement amount of the pressing member. This enables each of the plurality of bus bars to be properly pressurized in accordance with the gap between the bus bar and the corresponding terminal so as to decrease the gap, while avoiding applying excessive loads to the bus bars.

The pressurization start position may be a position where at least any one of the pressing members of the plurality of pressing sections contacts the corresponding bus bar.

The plurality of bus bars may be respectively welded to the corresponding terminal while pressed down by the pressurizing jig. This satisfactorily suppresses the bonding failure between the terminal of each of the plurality of battery cells and the bus bar.

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The technique of the present disclosure is applicable to, for example, the manufacturing industry of the battery pack.

The invention claimed is:

1. A method of manufacturing a battery pack including a case open at one end, a plurality of battery cells each including a terminal disposed on one surface thereof and stacked such that the one surfaces face the same direction to be accommodated in the case, and a plurality of bus bars respectively bonded to the corresponding terminal, the method comprising:
   stacking the plurality of battery cells such that the one surfaces face the same direction and compressing the plurality of battery cells from both sides;
   inserting the plurality of compressed battery cells into the case such that the one surfaces are positioned on an open end side of the case;
   measuring, using a distance measuring device, a first distance from the terminal of the battery cell farthest from a bottom surface of the case to a predetermined reference surface and a second distance from the terminal of the battery cell closest to the bottom surface of the case to the reference surface after inserting the plurality of battery cells into the case;
   disposing, after measuring the distance, the plurality of bus bars on the one surfaces of the plurality of battery cells so as to overlap the corresponding terminal;
   moving a pressurizing jig, which includes at least the same number of pressing sections as the number of battery cells of the battery pack, so as to press the plurality of bus bars toward the bottom surface of the case from a pressurization start position corresponding to a height position of the terminal of the battery cell farthest from the bottom surface; and
   bonding each of the plurality of bus bars to the corresponding terminal; and
   wherein the pressurizing jig is moved from the pressurization start position by at least a difference between the first distance and the second distance.

2. The method of manufacturing a battery pack according to claim 1,
   wherein the pressurizing jig is moved from the pressurization start position by at least a difference between the height position of the terminal of the battery cell farthest from the bottom surface of the case and the height position of the terminal of the battery cell closest to the bottom surface of the case.

3. The method of manufacturing a battery pack according to claim 1, wherein each of the pressing sections includes a pressing member configured to contact the bus bar, a support member that movably supports the pressing member in a movement direction of the pressurizing jig, and a pressurizing mechanism that is disposed between the pressing member and the support member and generates a load corresponding to a movement amount of the pressing member.

4. The method of manufacturing a battery pack according to claim 3,
   wherein the pressurization start position is a position where at least any one of the pressing members of the plurality of pressing sections contacts the corresponding bus bar.

5. The method of manufacturing a battery pack according to claim 1,
   wherein the plurality of bus bars are respectively welded to the corresponding terminal while pressed down by the pressurizing jig.

6. The method of manufacturing a battery pack according to claim 1, wherein the distance measuring device is a laser rangefinder.

7. A method of manufacturing a battery pack including a case open at one end, a plurality of battery cells each including a terminal disposed on one surface thereof and stacked such that the one surfaces face the same direction to be accommodated in the case, and a plurality of bus bars respectively bonded to the corresponding terminal, the method comprising:
   stacking the plurality of battery cells such that the one surfaces face the same direction and compressing the plurality of battery cells from both sides;
   inserting the plurality of compressed battery cells into the case such that the one surfaces are positioned on an open end side of the case;
   disposing the plurality of bus bars on the one surfaces of the plurality of battery cells so as to overlap the corresponding terminal;
   moving a pressurizing jig so as to press the plurality of bus bars toward a bottom surface of the case from a pressurization start position corresponding to a height position of the terminal of the battery cell farthest from the bottom surface; and
   bonding each of the plurality of bus bars to the corresponding terminal,
   wherein each of a plurality of pressing sections of the pressurizing jig includes a pair of pressing members configured to contact the bus bar, a pair of support members that movably support the pressing member in a movement direction of the pressurizing jig, and a pair of pressurizing mechanisms that are disposed between the pressing member and the support member and generate a load corresponding to a movement amount of the pair of pressing members, the pair of pressing members extending from the pair of support members.

8. The method of manufacturing a battery pack according to claim 7, wherein the pressurizing jig is moved from the pressurization start position by at least a difference between the height position of the terminal of the battery cell farthest from the bottom surface of the case and the height position of the terminal of the battery cell closest to the bottom surface of the case.

9. The method of manufacturing a battery pack according to claim 7, further comprising:
   acquiring a distance from the terminal of the battery cell farthest from the bottom surface of the case to a predetermined reference surface and a distance from the terminal of the battery cell closest to the bottom surface of the case to the reference surface after inserting the plurality of battery cells into the case and before disposing the plurality of bus bars on the one surfaces of the plurality of battery cells.

10. The method of manufacturing a battery pack according to claim 7,
    wherein the pressurization start position is a position where at least any one of the pressing members of the plurality of pressing sections contacts the corresponding bus bar.

11. The method of manufacturing a battery pack according to claim 7, wherein the plurality of bus bars are respectively welded to the corresponding terminal while pressed down by the pressurizing jig.

12. The method of manufacturing a battery pack according to claim 7, wherein the pair of support members directly movably supports the pair of pressing members.

* * * * *